No. 742,864. PATENTED NOV. 3, 1903.
E. HANNON.
ELECTROLYTIC PROCESS.
APPLICATION FILED OCT. 4, 1898.
NO MODEL.
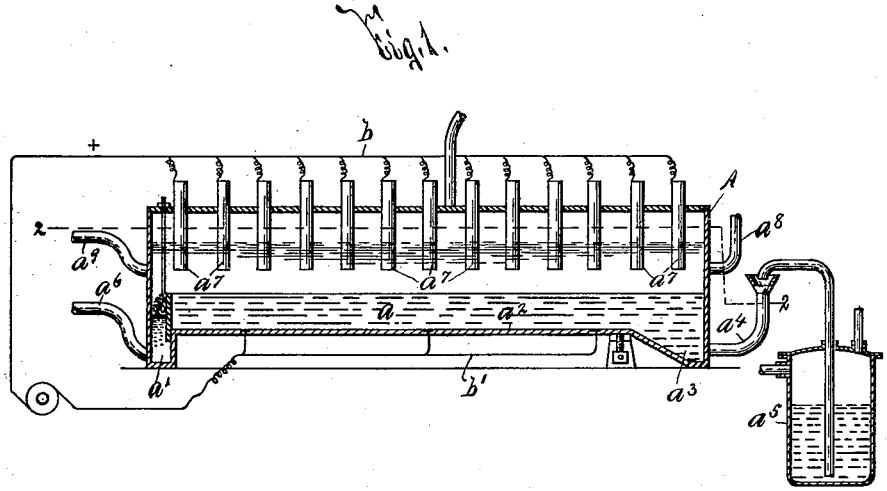
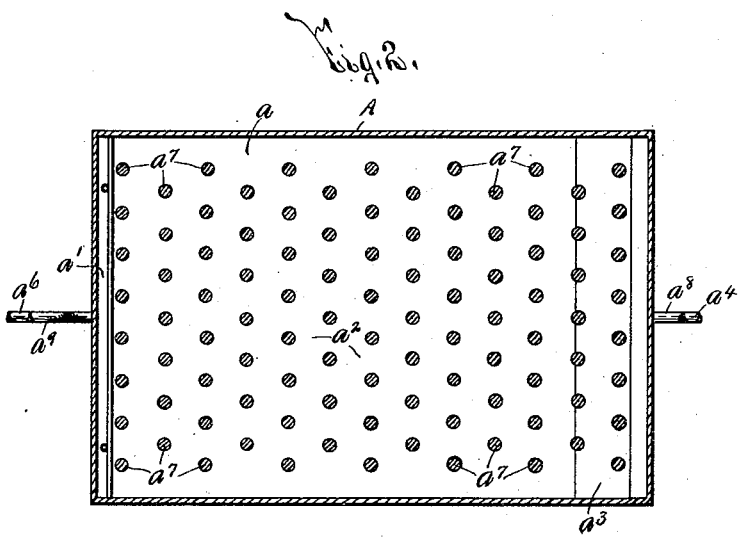
WITNESSES:
INVENTOR
Edward Hannon
BY
Hay & Parsons,
ATTORNEYS.

No. 742,864.

Patented November 3, 1903.

UNITED STATES PATENT OFFICE.

EDOUARD HANNON, OF BRUSSELS, BELGIUM, ASSIGNOR TO THE SOLVAY PROCESS COMPANY, OF SYRACUSE, NEW YORK, A CORPORATION OF NEW YORK.

ELECTROLYTIC PROCESS.

SPECIFICATION forming part of Letters Patent No. 742,864, dated November 3, 1903.

Application filed October 4, 1898. Serial No. 692,603. (No specimens.)

*To all whom it may concern:*

Be it known that I, EDOUARD HANNON, a subject of the King of Belgium, residing at Brussels, Belgium, have invented a new and useful Electrolytic Process, (for which I have filed applications for foreign Letters Patent as follows: in Belgium, No. 134,177, March 5, 1898; in Great Britain, No. 7,470, March 28, 1898; in Germany, No. S. 11, 225/75, March 18, 1898; in Russia, No. 4,602, May 4/16, 1898; in France, No. 266,676, June 14, 1898; in Switzerland, No. 18,973, July 28, 1898; in Austria, August 12, 1898, and in Hungary, No. 12,054, August 25, 1898,) of which the following is a specification.

My invention consists of a simple, practical, and effective electrolytic process particularly applicable for electrolyzing alkaline chlorids and other salts in the presence of a fluid electrode, as mercury, as hereinafter specifically described, and pointed out in the claim.

In describing this invention reference is had to the accompanying drawings, in which like letters indicate corresponding parts in both views.

Figure 1 is a vertical sectional view of an electrolytic apparatus particulary applicable for carrying out my process. Fig. 2 is a horizontal sectional view taken on line 2 2, Fig. 1.

In carrying out the present processes for electrolyzing alkaline chlorids and other salts in which fluid electrodes, as mercury, are utilized it is customary to effect the circulation of the fluid electrode by rocking the apparatus, by causing the electrode to flow along an inclined surface or in spiral channels, or by displacing the same by pistons, plungers, pumps, and other devices. These processes are more or less objectionable, since if the movement of the fluid electrode is arrested the supply thereof ceases, although the current continues to pass. My process differs from said processes in that the surface of the fluid electrode adjacent to the electrolyte is removed from the remaining portion of said electrode, and the portion of the electrolyte adjacent to the fluid electrode is caused to move along said adjacent surface of the fluid electrode in the same direction as that of said surface during the removal thereof and is removed from said surface of the fluid electrode without being mixed therewith, thus continually presenting a fresh surface to the metal being liberated on the electrode, facilitating the removal of the liberated metal, and reducing to a minimum the liability of agitation of the electrode, the moving surface thereof, and said liberated metal. The alkaline amalgam forms in greatest quantity at the surface of the fluid electrode adjacent to the electrolyte and tends to remain on said surface by reason of its lightness. Consequently my process is particulary practical and effective, since the surface of the fluid electrode which is richest in alkaline metal is positively and readily withdrawn without displacement of the remaining portion of the fluid electrode or agitation of said surface during its removal from said remaining portion of the electrode.

In order that my process may be readily understood, I have shown and will briefly describe an electrolytic apparatus which is particularly applicable for carrying out said process. This apparatus is composed of a receptacle A for receiving the electrolyte and a fluid electrode, as mercury, and suitable means for removing the upper surface of the electrode from above the underlying body thereof and for moving the contiguous portion of the electrolyte along said surface in the same direction as that of said surface and during the removal thereof and for removing said contiguous portion of the electrolyte without mixing the same with said surface of the electrode. Said receptacle is composed of hard rubber, glass, or other suitable material and is provided with chambers $a$ $a'$, arranged side by side at its base $a^2$. The fluid electrode is admitted to one side of the chamber $a$ by a supply-reservoir $a^3$ and overflows from the opposite side of said chamber into the chamber $a'$. The reservoir $a^3$ is supplied with fluid electrode by an inlet-conduit $a^4$, discharging into said reservoir beneath the level of the fluid electrode therein and connected to a suitable source, as a fluid-elevator $a^5$, which may be of any desirable form, size, and construction. The illustrated fluid-elevator consists of a closed shell partly filled, as indicated by the dotted line therein in Fig. 1, with the material, as mercury, forming the fluid electrode, an inlet-conduit for said material, an outlet-conduit leading from a point below the level of the material to the inlet-conduit $a^4$, and a third conduit for discharging a suitable fluid under pressure above said material and forcing the same through said outlet-conduit. The fluid electrode is withdrawn from the chamber $a'$ by an outlet-conduit $a^6$, which opens from the chamber $a'$ below the level of the fluid electrode therein and is so arranged and connected that the level of the fluid electrode within the chamber $a'$ and conduit $a^6$ is below the level of the fluid electrode in the chamber $a$.

The electrolyte within the receptacle A contains the alkaline chlorids or other salts to be electrolyzed, is supported upon the fluid electrode in the chambers $a$ $a'$, and receives a suitable electrode, as a plurality of conductors $a^7$, which are connected to one of the branches or conductors $b'$ of an electric circuit, having its other branch or conductor $b$ passed through the bottom wall of the receptacle A and electrically connected to the fluid electrode. Said electrolyte is conducted to and from the receptacle A by inlet and outlet conduits $a^8$ $a^9$, which communicate with the receptacle A at points directly above the conduits $a^4$ $a^6$ and cause the electrolyte to move along the adjacent or upper surface of the fluid electrode in the chamber $a$ in the same direction as that of said surface of the fluid electrode when overflowing from the chamber $a$ to the chamber $a'$ for facilitating the removal of said surface of the fluid electrode and reducing to a minimum the liability of agitation of the electrode, the moving surface thereof, and the metal amalgam.

The described electrolytic apparatus is particularly applicable for carrying out my process; but I do not limit my invention thereto, as any other suitable means may be employed in carrying out said process.

My electrolytic process will now be readily understood upon reference to the foregoing description and the accompanying drawings.

Having thus fully described my invention, what I claim as new, and desire to secure by Letters Patent, is—

The herein-described electrolytic process, the same consisting in passing an electric current through an electrolyte and a fluid electrode adjacent thereto, in removing the surface of the fluid electrode adjacent to the electrolyte from the remaining portion of said electrode, and in moving the electrolyte along said adjacent surface of the fluid electrode during the removal of said surface and in the same direction as that of the movement thereof, substantially as and for the purpose described.

In testimony whereof I have hereunto signed my name, in the presence of two attesting witnesses, at Brussels, Belgium, this 1st day of September, 1898.

EDOUARD HANNON.

Witnesses:
J. S. FÜRSTENKOFF,
GREGORY PHELAN.